United States Patent
Martell et al.

(10) Patent No.: US 8,639,476 B2
(45) Date of Patent: Jan. 28, 2014

(54) PROCESS FOR ESTIMATION OF BALLISTIC MISSILE BOOST STATE

(75) Inventors: Craig A. Martell, Spotsylvania, VA (US); John A. Lawton, King George, VA (US); David B. Hurley, Fredericksburg, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 26 days.

(21) Appl. No.: 13/385,465

(22) Filed: Jan. 31, 2012

(65) Prior Publication Data

US 2012/0316819 A1 Dec. 13, 2012

Related U.S. Application Data

(63) Continuation-in-part of application No. 12/454,489, filed on Apr. 17, 2009, now abandoned.

(60) Provisional application No. 61/127,330, filed on Apr. 22, 2008.

(51) Int. Cl.
*F42B 15/01* (2006.01)
*F42B 15/12* (2006.01)

(52) U.S. Cl.
USPC ............ 702/196; 702/142; 702/150; 702/190

(58) Field of Classification Search
USPC .................................. 702/196, 142, 150, 190
See application file for complete search history.

(56) References Cited

PUBLICATIONS

Li et al., A Survey of Maneuvering Target Tracking—Part III: Measurement Models, Jul. 2001. Proceedings of SPIE Conference on Signal and Data Processing of Small Targets, San Diego, CA, pp. 1-24.*
Ristic et al., Tracking a manoeuvring target using angle-only measurements: algorithms and performance, Jun. 2003, Signal Processing, vol. 83, Issue 6, pp. 1223-1238.*
Yeddanapudi et al., Ballistic Missile Track Initiation From Satellite Observations, Jul. 1995, IEEE Transactions on Aerospace and Electronic Systems, vol. 31, No. 3, pp. 1054-1071.*
Weiner et al., Application of Angle-Only Track to Ballistic Missile Defense, Decision and Control including the 15th Symposium on Adaptive Processes, 1976, pp. 579-584.*

* cited by examiner

*Primary Examiner* — Janet Suglo
(74) *Attorney, Agent, or Firm* — Gerhard W. Thielman, Esq

(57) ABSTRACT

A computer-implemented method is provided for generating the estimation of current position, velocity and acceleration state vectors and associated uncertainty estimation (covariance) of a boosting ballistic missile. The method includes constructing a state tensor of the projectile from a plurality of sensor measurements in Earth-Centered, Earth-Fixed (ECEF) coordinates; translating the state tensor to Cartesian coordinates as a transform state; determining a covariance matrix from the transform state; updating the transformed state as an updated transform state; and updating the covariance matrix as an updated covariance. The process can further include adjusting the covariance matrix by an approximate transition matrix and a process noise matrix. The noise matrix can be translated from a local noise matrix based on a propagation time-step, a scaling parameter, and a bias process noise level. A time-of-flight in the state tensor can be updated by smoothing from a launch event.

12 Claims, 7 Drawing Sheets

US 8,639,476 B2

PROCESS FOR ESTIMATION OF BALLISTIC MISSILE BOOST STATE

CROSS REFERENCE TO RELATED APPLICATION

The invention is a Continuation-in-Part, claims priority to and incorporates by reference in its entirety U.S. patent application Ser. No. 12/454,489 filed Apr. 17, 2009 and assigned Navy Case 99283, which, pursuant to 35 U.S.C. §119, claims the benefit of priority from provisional application 61/127,330, with a filing date of Apr. 22, 2008.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to the estimation of current position, velocity and acceleration state vectors and associated uncertainty estimation (covariance) of a boosting ballistic missile using passive infrared angles-only measurements from multiple satellite platforms. In particular, the invention relates to constructing and updating a state vectors and covariance matrices.

Existing legacy methods for Overhead Persistent Infra-Red (OPIR) processing use the measurements to do a least-squares fit to either (1) missile booster parameters, or (2) a polynomial curve. The OPIR Robust Boost-Phase State Estimation Algorithm (ORBSEA) process was developed to investigate Kalman Filter techniques to process the OPIR measurements absent information about the target missile parameters. The exemplary Kalman Filter performs adequately for boosting and ballistic trajectories. This Kalman Filter adjusts quickly to varying dynamics over the course of the trajectory, including transition from high thrusting to booster burnout. Another expected advantage of this Kalman Filter is the accurate estimation of the State Vector errors (via covariance). The covariance includes the uncertainty in the OPIR measurements and the uncertainty in the missile dynamics.

SUMMARY

Conventional methods for generating an estimate of boosting ballistic missiles (i.e., in boost phase) derived from passive infrared measurements yield disadvantages addressed by various exemplary embodiments of the present invention. In particular, the method includes constructing a state tensor of the projectile from a plurality of sensor measurements in Earth-Centered, Earth-Fixed (ECEF) coordinates; translating the state tensor to Cartesian coordinates as a transformed state; determining a covariance matrix from the transformed state; updating the transformed state; and updating the transformed covariance.

In various exemplary embodiments, the process can further include adjusting the covariance matrix by an approximate transition matrix and a process noise matrix. The noise matrix can be translated from a local noise matrix based on a propagation time-step, a time dependent scaling parameter, and a bias process noise level. A time-of-flight in the state tensor can be updated by smoothing from a launch event.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
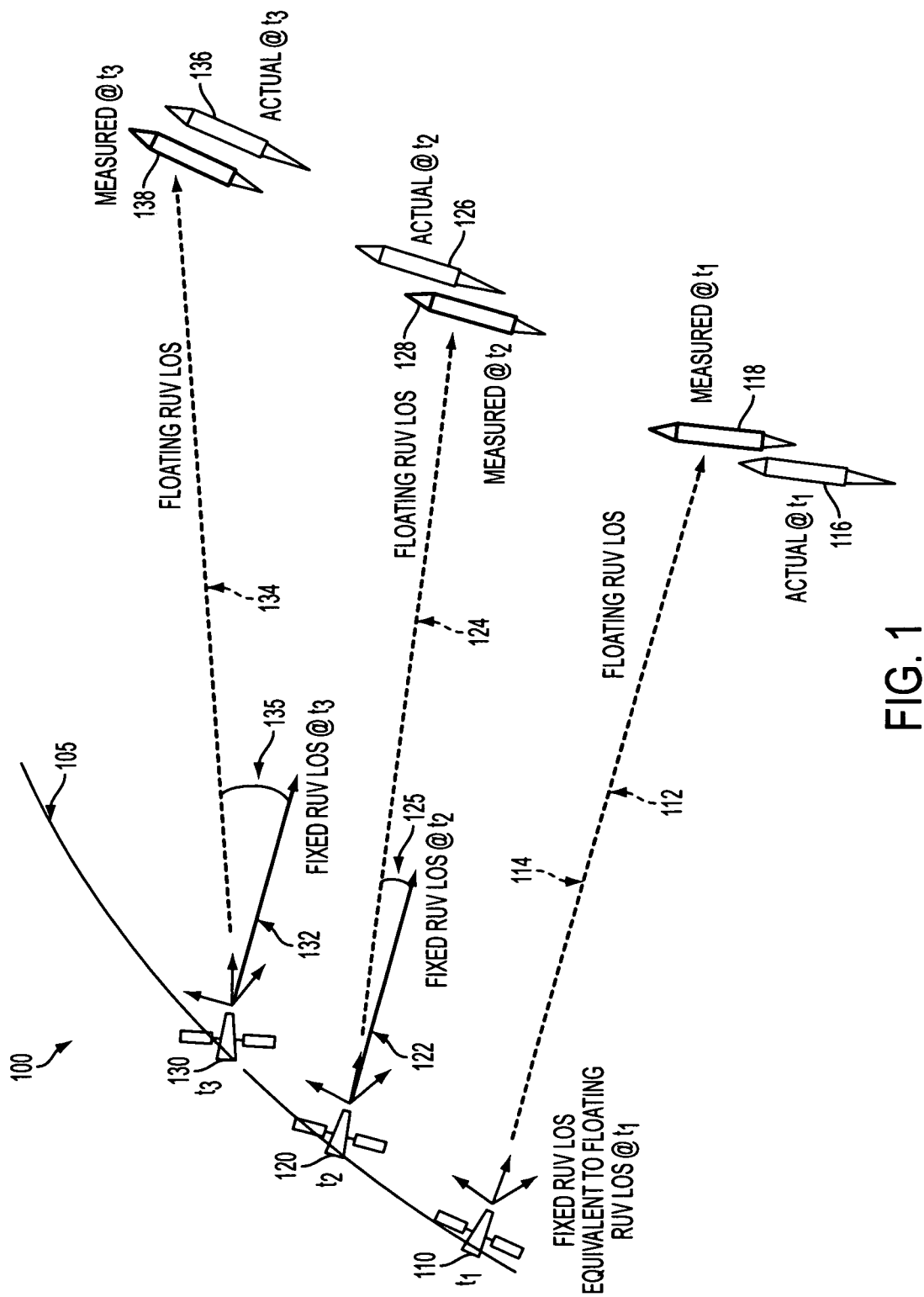
FIG. 1 is a diagram illustrating a floating RUV co-ordinate frame.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose data processing machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

A brief overview is provided that relates to the determination of an estimated state vector and associated covariance. This estimate derives from OPIR sensor data processed through the fusion algorithm developed at Naval Surface Warfare Center, Dahlgren Division (NSWCDD). The described methodology assumes no additional target information after the provision of uncertainty estimates and filter tuning parameters. The process generates the desired state vector estimate and associated uncertainty estimate, and is incorporated into the inventive ORBSEA augmented process, as described herein. This constitutes a portion of the NSWCDD OPIR state boost-phase state estimation algorithm.

Various exemplary embodiments provide a computer-implemented method for determining position, velocity, and acceleration and launch location, time, and direction estimates of boosting ballistic missiles. The process employs a fundamental framework with the extended Kalman filter, including several particular improvements. The extended Kalman filter includes for its state X tensor:

$$X = \begin{bmatrix} \vec{r} \\ \vec{v} \\ \vec{a} \\ b_1 \\ \vdots \\ b_q \end{bmatrix}, \quad (1)$$

where $\vec{r}$ is the position vector of the missile in ECEF Cartesian coordinates, and $\vec{v}$ and $\vec{a}$ are respective vectors for the velocity and acceleration of the missile in the same ECEF coordinates. The acceleration vector $\vec{a}$ does not include gravitational acceleration, nor the coriolis and centripetal accelerations. These acceleration terms are assumed as known, and so need not be estimated with the filter. Thus, the missile acceleration vector $\vec{a}$ represents the total contributions that do need to be estimated, namely the acceleration due to rocket motor thrust, and aerodynamic accelerations.

The $b_j$ terms represent 2×1 bias estimation vectors for each of the q sensors that are observing the target missile. Real-world OPIR measurements can have large unknown biases. These biases are estimated by ORBSEA, in order to reduce the overall errors in the estimation of $\vec{r}$, $\vec{v}$ and $\vec{a}$. Including these bias estimation parameters consistently reduces the overall estimation errors by around 30-40%.

The state time-differential equation $dX/dt = \dot{X}$ can be expressed as:

$$\dot{X} = \begin{bmatrix} \vec{v} \\ \vec{a} + \vec{a}_R \\ 0 \\ 0 \\ \vdots \\ 0 \end{bmatrix}, \quad (2)$$

where $\vec{a}_R$ is the sum of the gravitational acceleration, the coriolis acceleration, and the centripetal accelerations. The integration of this differential eqn. (2) provides the propagation of the estimation of the state vector forward in time between measurements.

The state transition matrix $\Phi$, used to propagate the state covariance matrix P, is approximated within the filter by:

$$\Phi(t, t_0) = \begin{bmatrix} I & (t-t_0)\cdot I & \frac{1}{2}(t-t_0)^2 \cdot I & 0 & \cdots & 0 \\ 0 & I & (t-t_0)\cdot I & 0 & \cdots & 0 \\ 0 & 0 & I & 0 & \cdots & 0 \\ 0 & 0 & 0 & I & \cdots & 0 \\ \vdots & \vdots & \vdots & \vdots & \ddots & 0 \\ 0 & 0 & 0 & 0 & 0 & I \end{bmatrix}, \quad (3)$$

where t is time, $t_o$ is initial time and I represents an identity matrix.

Propagation of the state covariance matrix P can be carried forward in time incrementally based on measurement number k. This propagation based on the transition $\Phi$ can be expressed from the time $t_k$ of measurement number k to the time $t_{k+1}$ of measurement number k+1 as:

$$P_{k+1,k} = \Phi(t_{k+1}, t_k) \cdot P_{k,k} \cdot \Phi(t_{k+1}, t_k)^T + Q(t_{k+1} - t_k), \quad (4)$$

where Q(t) is the process noise matrix using Process Noise Shaping (PNS) and the normalized innovation squared (NIS) statistic. The process noise matrix can be evaluated using the Ascending and Descending Stair-step Process-noise Adjustment via NIS (ADSPAN) method.

In eqn. (4), double-index subscripts indicate that the first index corresponds to the current time ($t_{k+1}$ in this example), and that the second index corresponds to the time of the latest measurement incorporated in the current estimate ($t_k$ in this case). This notation holds for both states and state covariances in subsequent equations. The two novel techniques for shaping, PNS, and sizing the process noise (ADSPAN) reduce the average errors of the estimates by over 50%, compared with the alternative of larger values for the measurement covariance matrix to account for these biases.

To update the state and state covariance at a given time of satellite measurement availability, the position and velocity vectors within the state are transformed to radius/u-normalized direction cosine/v-normalized direction cosine (RUV) coordinates. The transformation is accomplished in several steps.

First, the ECEF Cartesian coordinates of position and velocity are transformed to another Cartesian frame whose z-axis points along the unit vector designating the direction of the actual current measurement, relative to the satellite location. Subsequently, convenient y and x axes orthogonal to z can be constructed. Then, for x, y, and z representing the state position coordinates in this newly formed local Cartesian frame, the RUV coordinates are computed as follows:

$$r = \sqrt{x^2 + y^2 + z^2} \quad (5)$$

$$u = x/r \quad (6)$$

$$v = y/r \quad (7)$$

$$v = y/r \quad (7)$$

$$\dot{r} = (x\dot{x} + y\dot{y} + z\dot{z})/r \quad (8)$$

$$\dot{u} = (\dot{x}r - x\dot{r})/r^2 \quad (9)$$

$$\dot{v} = (\dot{y}r - y\dot{r})/r^2, \quad (10)$$

where r is the radius, u is the loft state coordinate, v is the cross-track state co-ordinate, $\dot{r}$ is the temporal range change, $\dot{u}$ is the temporal loft change and $\dot{v}$ is the temporal cross-track change.

The total transformed state Y can be denoted as tensor:

$$Y = \begin{bmatrix} r \\ u \\ v \\ \dot{r} \\ \dot{u} \\ \dot{v} \\ \vec{a} \\ b_1 \\ \vdots \\ b_q \end{bmatrix}, \quad (11)$$

in scalar form, in contrast to the eqn. (1) for the initial Kalman state tensor.

Corresponding to these transformed values, the state covariance matrix can be transformed by the usual covariance transformation expression:

$$P_{ruv} = J \cdot P \cdot J^T \quad (12)$$

where $P_{ruv}$ is the state covariance in RUV space, and P is the corresponding covariance in ECEF space. The transformation Jacobian J can be expressed as:

$$J = \frac{\partial Y}{\partial X} \quad (13)$$

where Y and X represent the transformed and initial state tensors.

After transformation, the usual extended Kalman filter equations can be used to update the estimate of the state and the state's covariance based on the measurement at hand. Because the local coordinate system has been established with z pointing at the measurement, the x and y values of the measurement are identically zero, and hence the u and v values of the measurement are also zero. Therefore, the measurement vector in this coordinate system is identically zero.

Consequently, the form of the transformed state update equation Y for eqn. (11) simplifies to:

$$Y_{k+1,k+1} = Y_{k+1,k} - K \cdot H \cdot Y_{k+1,k}, \quad (14)$$

where K is Kalman gain and H is the measurement matrix. The Kalman gain K can be expressed as:

$$K = P_{k+1,k} \cdot H^T \cdot S^{-1}, \quad (15)$$

where $H^T$ represents the transpose of the measurement matrix, and the innovation covariance S is computed by:

$$S = H \cdot P_{k+1,k} \cdot H^T + R, \quad (16)$$

where R is the 2×2 measurement covariance matrix, and the measurement matrix H can be expressed as:

$$H = \begin{bmatrix} 0 & 1 & 0 & 0 & 0 & 0 & \ldots & 1 & 0 & \ldots & 0 \\ 0 & 0 & 1 & 0 & 0 & 0 & \ldots & 0 & 1 & \ldots & 0 \end{bmatrix} \quad (17)$$

determines what portion of the state is being measured. On the first row of H, the first "1" selects u from the state vector, and the second "1" selects the bias estimate associated with the u measurement, corresponding to the current satellite making the measurement. Each sensor platform has a bias estimate associated therewith. Similarly, the second row selects v and its bias estimate for the current sensor.

The state covariance P is also updated concurrently with the expression:

$$P_{k+1,k+1} = (I - K \cdot H) \cdot P_{k+1,k} \cdot (I - K \cdot H)^T + K \cdot R \cdot K^T, \quad (18)$$

where I, K, H and R correspond to the matrix parameters described earlier.

The updated state vector Y and state covariance matrix $P_{ruv}$ are then transformed back from RUV space to the ECEF frame, by the inverses of the transformations detailed above. This state estimation and its covariance are then ready to be propagated forward to the time of the next k measurement. Also, the estimation process can now employ this current estimate. This process continues until no more measurements are reported by any of the satellites reporting on the current event.

An ancillary filter called the Free-Flight Filter runs concurrently with the main filter just described. The Free-Flight Filter assumes zero thrust (that the rocket motors have been cut off), in contrast to the main filter. Because in this case the variations in the acceleration (chiefly gravity) are much smaller than for a thrusting rocket, the size of the process noise ϵ in the Q matrix is much smaller. Other than these primary differences, the two filters run in essentially the same manner—using the same coordinate systems, transformations, update equations, etc. The purpose for running this ancillary filter is to provide supplemental probability tests on whether the missile has terminated powered flight and hence, utilize when appropriate the solution from the ancillary filter.

The basic form of the extended Kalman filter has been available for over four decades. The key to the development of a good filter involves primarily the choice of the filter states, coordinate frames, the filter model of motion dynamics, the choice of implementing process noise and methods by which to tune this process noise, as well as other side calculation devices that benefit the process.

The first important selection for the ORBSEA process involves propagating the state in Cartesian coordinates, and subsequently transforming to RUV coordinates to do the estimation updates in that frame. A fixed-direction version of this method has been extensively used for radar systems. However, ORBSEA represents the first inventive implementation known to incorporate this RUV/Cartesian floating-frame dual-coordinate system for angles-only measurements filtering.

Tests have been performed to compare this RUV/Cartesian method to a comparable pure-Cartesian filter constructed specifically to test the benefits of this RUV/Cartesian method. For small measurement errors and good measurement geometries, the filters behaved almost identically, down to the size of the residual errors. However, the Cartesian filter diverges in response to large errors and poor measurement geometries. By contrast, the method of ORBSEA maintains reasonable estimation errors in this taxing regime, thereby demonstrating the benefit of this technique.

Furthermore, the choice of reference-direction of the RUV frame within ORBSEA is unique. At each measurement update, a new direction is chosen for the RUV frame for use along the unit vector of the current measurement direction. In the literature, the reference direction is statically defined, for example, by the face of a phased-array radar. The changing nature of the ORBSEA measurement frame provides instead for a "floating frame" by contrast. Reference to FIG. 1 shows a diagram 100 of the changing nature of the floating RUV frame relative to the statically defined RUV frame. An orbital trajectory 105 defines the path of reconnaissance tracking satellite that houses an appropriate target sensor. At a first time $t_1$ the satellite has a first position 110 having a first statically fixed RUV frame 112 coincident at that moment with a first redefined floating RUV frame 114 for tracking a target missile in boost phase. At the first time, the missile has an actual position 116 and a measured position 118 offset therefrom.

At a subsequent second time $t_2$ the satellite has a second position 120 along the orbit 105. At that position 120, the satellite has a second statically fixed RUV frame 122 and a second redefined floating RUV frame 124 for tracking the target missile, with an angular difference 125 therebetween due to relative motion by both the target and the sensor platform. At the second time $t_2$, the missile has an actual position 126 and a measured position 128. The operation of the floating RUV frame reduces the relative angular offset between actual and measured positions as compared to the first time.

At a subsequent third time $t_3$ the satellite has a third position 130 along the orbit 105. At that position 130, the satellite has a third statically fixed RUV frame 132 and a third redefined floating RUV frame 134 for tracking the target missile, with an angular difference 135 therebetween. At the third time $t_3$, the missile has an actual position 136 and a measured position 138 offset therefrom. Again, the operation of the floating RUV frame further reduces the relative angular offset between actual and measured positions similar to that done at the first and second time. At the third time $t_3$ (later than the second time $t_2$), continued target and sensor motion shows the increasing angular difference 135 between the two RUV frames. This angular difference 135 has both u and v components.

The floating RUV frame has the advantage of reducing the potential errors caused by large values of u and v for angles-only measurements. For small values of u and v centered about the measurements, the assumed Gaussian-shape of the measurement errors is retained. For large u and v, this simplifying assumption no longer remains valid. Thus, the floating frame helps to maintain the filter consistent and the errors low.

Development of the floating RUV frame has its origins in the postdoctoral research performed at NSWCDD as one of the means to optimize performance of the Kalman filter. The floating RUV frame being just one of the techniques implemented as described which improves overall filter performance. It is speculated that early use of the static RUV frame is linked to the limited computational power of the early computer era. Performing constant reference frame transformations upon which the floating frame requires was not a reasonable approach given the need to provide timely answers using early computer systems.

The ORBSEA process estimates current position, velocity, and acceleration state vectors of a target missile using passive infrared (IR) angles-only measurements from multiple satellite platforms. Artisans of ordinary skill will recognize that the inclusion of IR sensor information is exemplary and thus does not limit the invention, which can employ alternate sources of measurement data of a target missile, such as radar and visible-light detectors. Additionally, the algorithmic process estimates the missile track position and velocity vector after the missile main boosters have burned out. The algorithmic process also provides for estimating the missile launch location and launch time.

This development has produced an estimation method both robust and accurate. As applied, robust denotes ability to produce reasonable and useful estimates over a broad spectrum of targets, from benign to challenging flight dynamics. Some of the challenges in the target dynamics include missiles with large trajectory path maneuvers and/or non-powered flight between stages. The method is also robust in the processing of IR measurement data. The process accounts for OPIR measurement biases, outliers, inaccuracies, and lack of redundant sources (monocular coverage). ORBSEA demonstrates this goal of producing accurate and robust results for a variety of real-world events and includes those testing system limits and those that were obviously mission failures.

Figure 2:
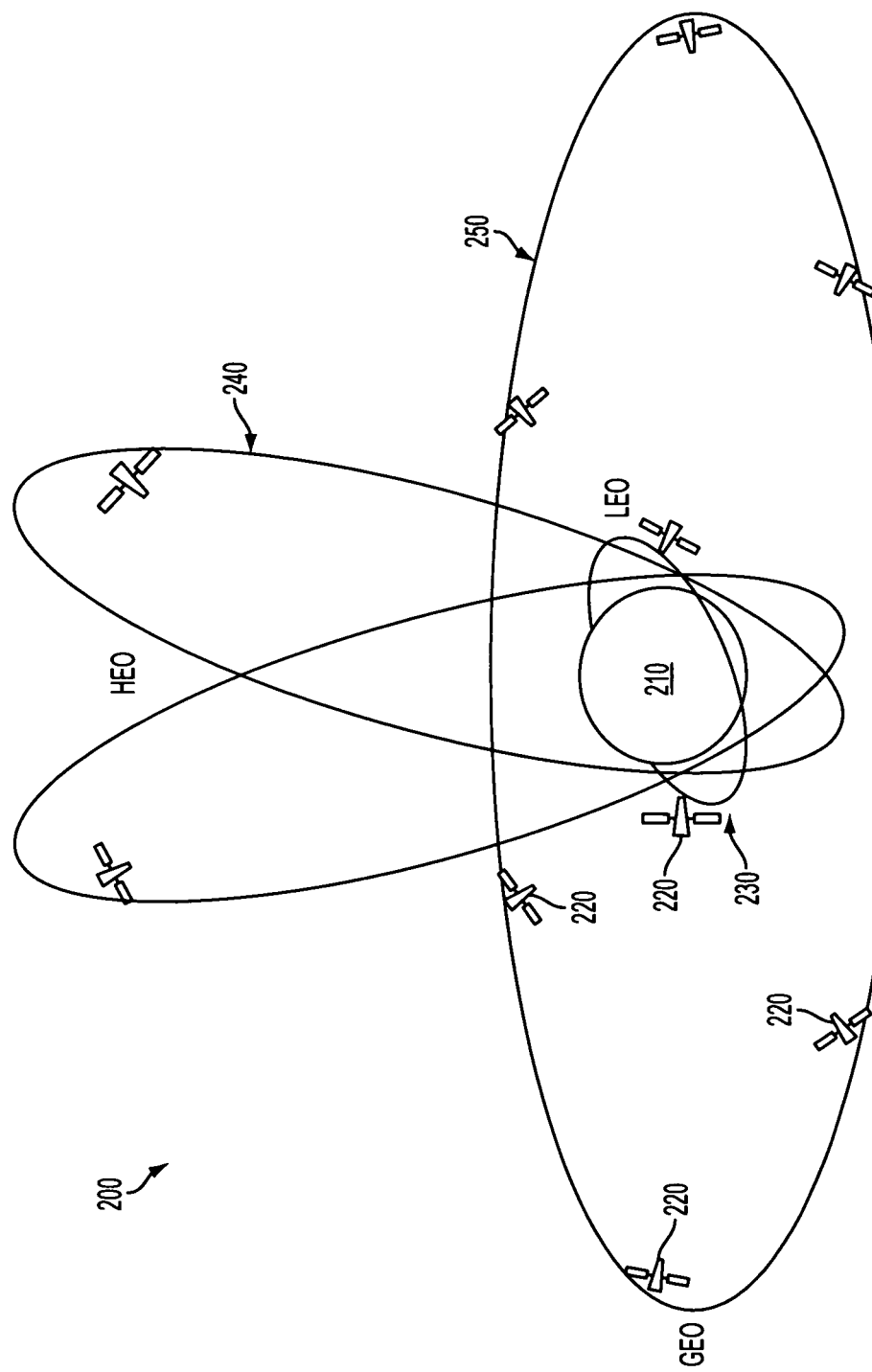
FIG. 2 is a diagram of representative OPIR satellite constellations.
Figure 3:
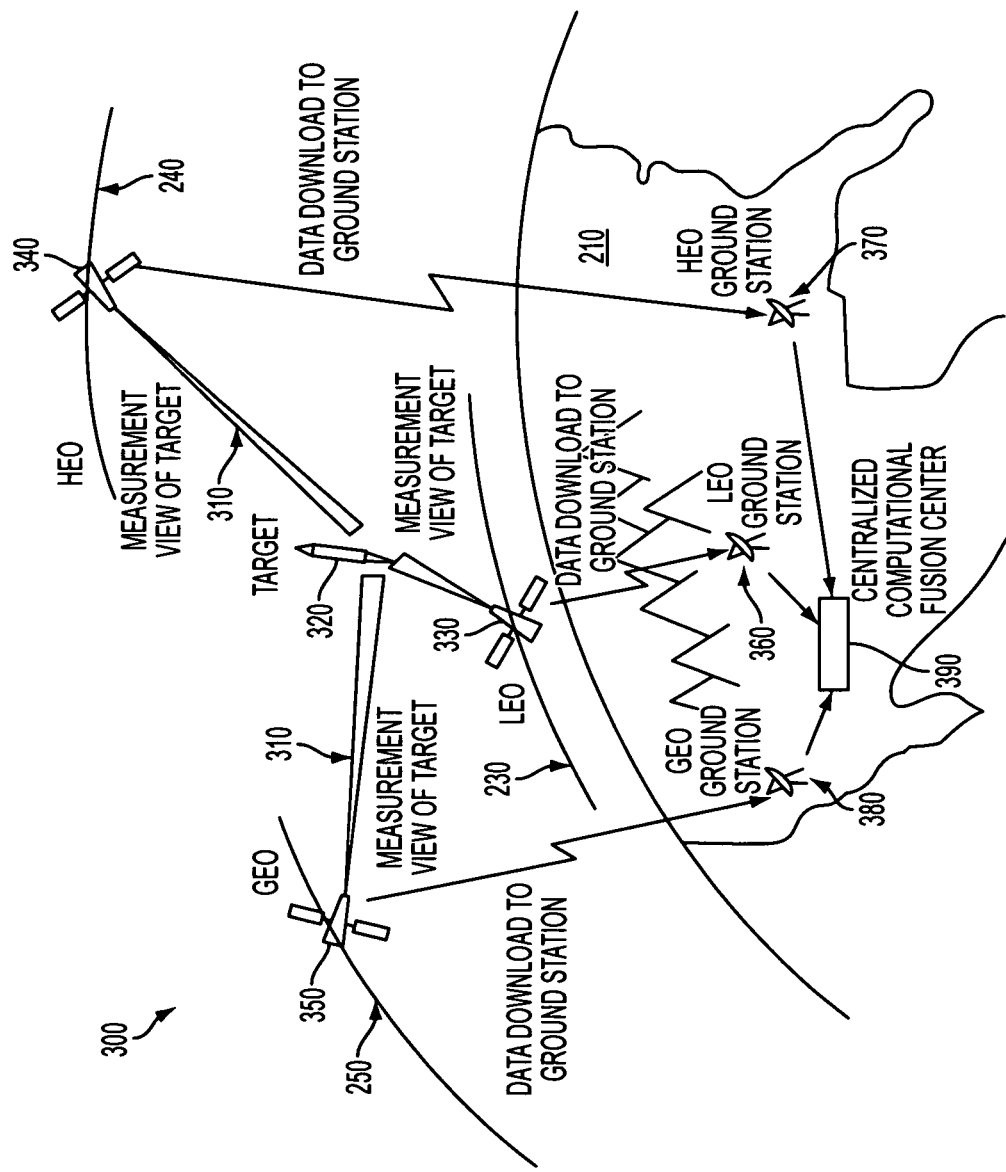
FIG. 3 is a schematic view of representative OPIR data architecture.
Figure 4:
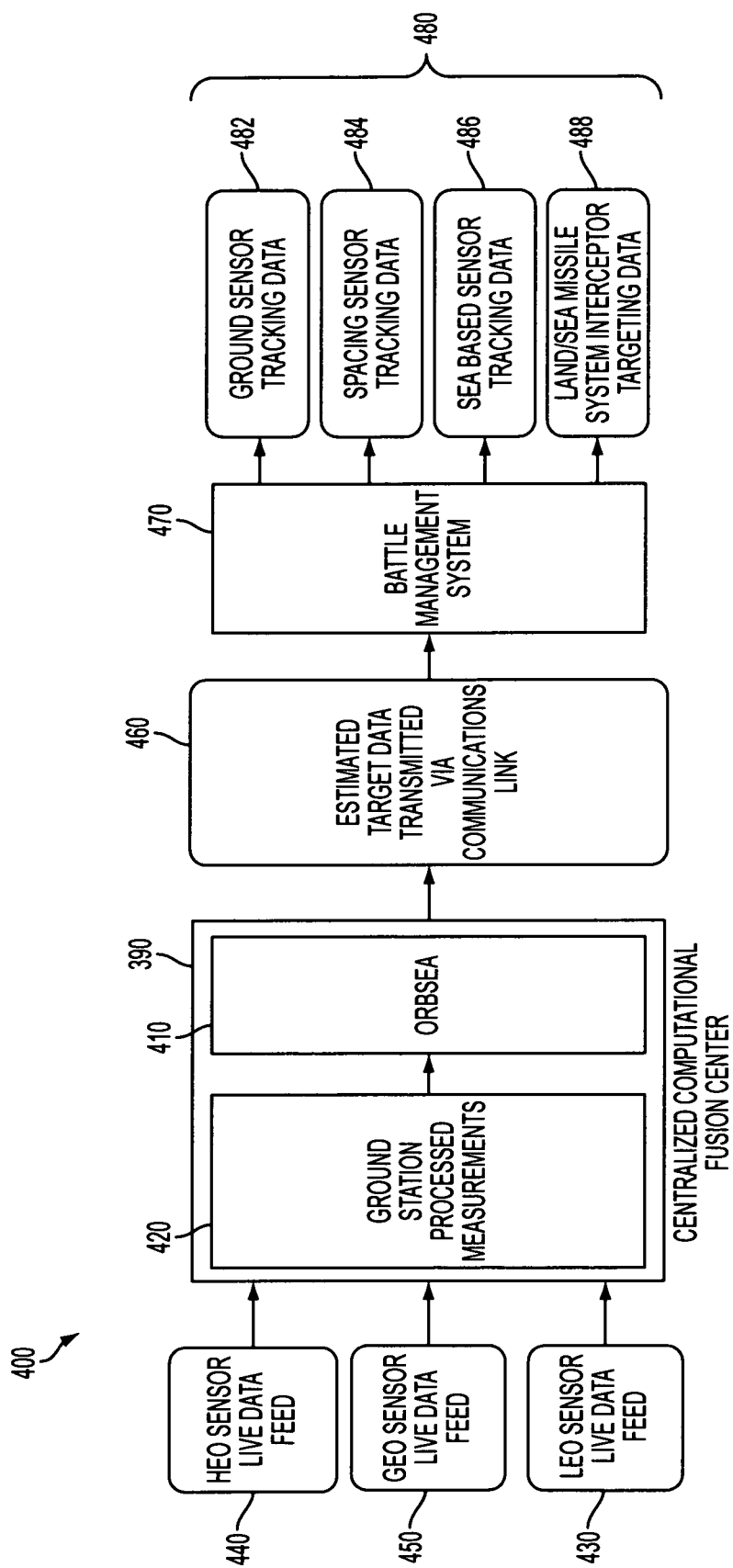
FIG. 4 is a schematic view of data processing flow and utilization.

FIGS. 2, 3, and 4 represent diagrams to aid in describing the real time operating environment within which ORBSEA functions. FIG. 2 shows an orbital diagram 200 of the Earth 210 enveloped by a constellation of orbiting satellites 220 to provide sensor data in real-time. The satellites 220 can be functionally distinguished by the different types of available orbits: Low Earth Orbit (LEO) 230, highly elliptical orbits (HEO) 240, and geo-synchronous orbits (GEO) 250 that follow the longitude of the Earth 210.

FIG. 3 shows the schematic 300 of data flow from observation by sensors in the different constellations to the respective data ground processing stations on Earth 210 and subsequently on to the centralized computational fusion center. In a first data collection operation, sensor measurements 310 are conducted on a target missile 320 by a plurality of satellites: a first satellite 330 in LEO 230, a second satellite 340 in HEO 240, and a third satellite 350 in GEO 250. In a second data transfer operation, the measurement data are transmitted from the satellites 330, 340 and 350 to corresponding first, second and third ground data processing stations 360, 370 and 380. Due to the differing distances between the satellites and their receiving ground stations, the data transmission may be temporally asynchronous with respect to each other's orbit. This asynchronous data transfer process provides the real-time data stream to the centralized computational fusion center within which ORBSEA resides to do the computer processing for generating the estimated target data. Finally, in a third data collection operation, the processed data are forwarded from the data processing stations 360, 370 and 380 to a centralized data fusion center 390.

FIG. 4 illustrates a data flow diagram 400 through the computational processing fusion center 390 equipped with ORBSEA 410 to the various users of the ORBSEA data products based on processed sensor measurements 420 from the real-time data feed corresponding to the LEO transmission 430 from the first station 360, the HEO transmission 440 from the second station 370 and the GEO transmission 450 from the third station 380.

ORBSEA 410 provides estimated target data 460 that are presented to a battle management system 470. The target data 460 represent a single set of measurements frp, separate feed sources. The system 470 passes select information 480 to associated processors for addressing the target missile 320. For example, the information 480 can include ground sensor tracking data 482, space sensor tracking data 484, sea-based tracking data 486, and missile system interceptor targeting data 488. The operators receiving notional data 482, 484 and 486 initiate refined search areas for their respective sensor systems. The final operator that receives interception data 488 initiates targeting solutions for the respective interceptor systems used to engage the associated threat target missile 320.

Figure 5:
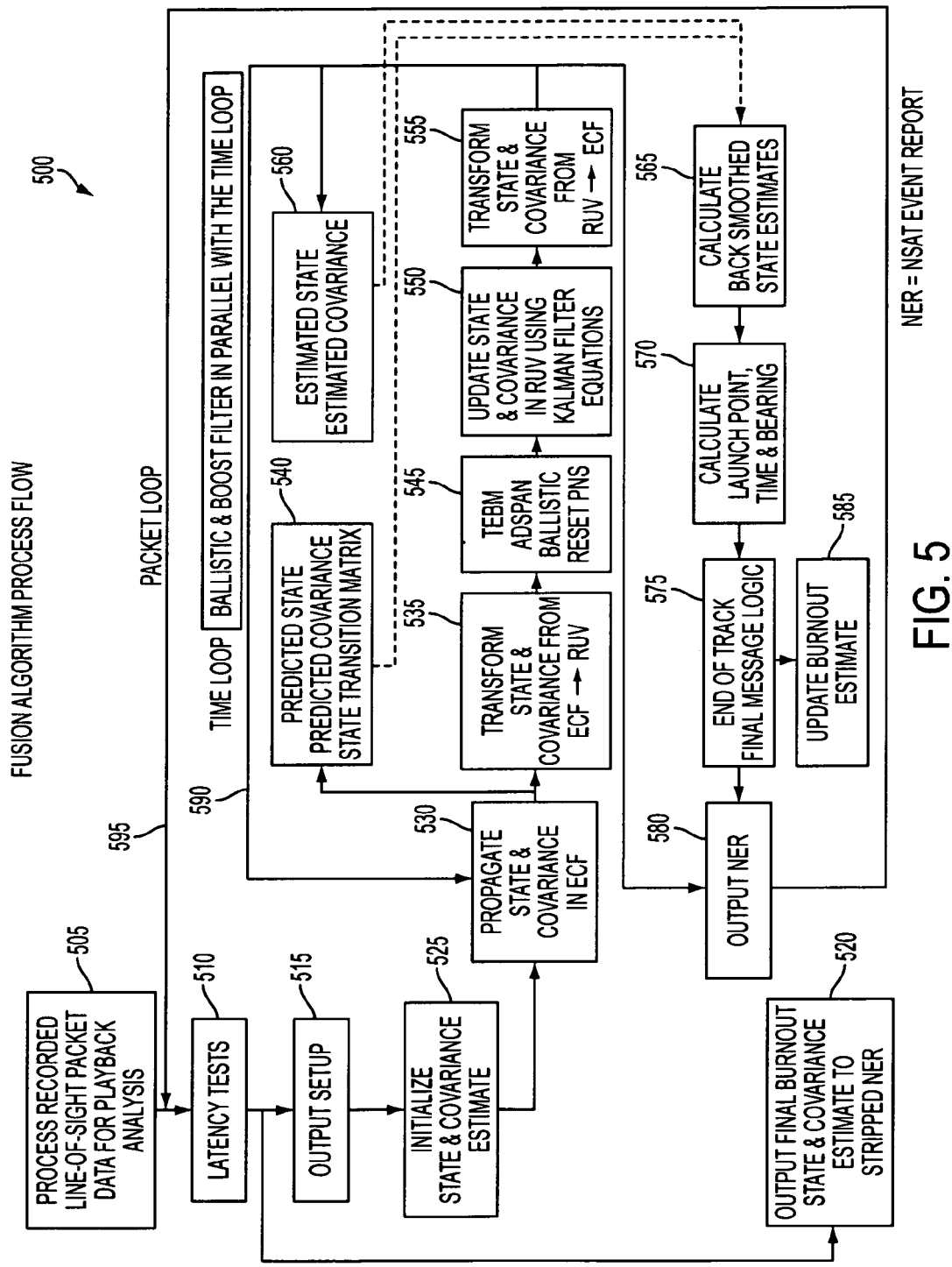
FIG. 5 is a schematic view of a fusion algorithm process.
Figure 6:
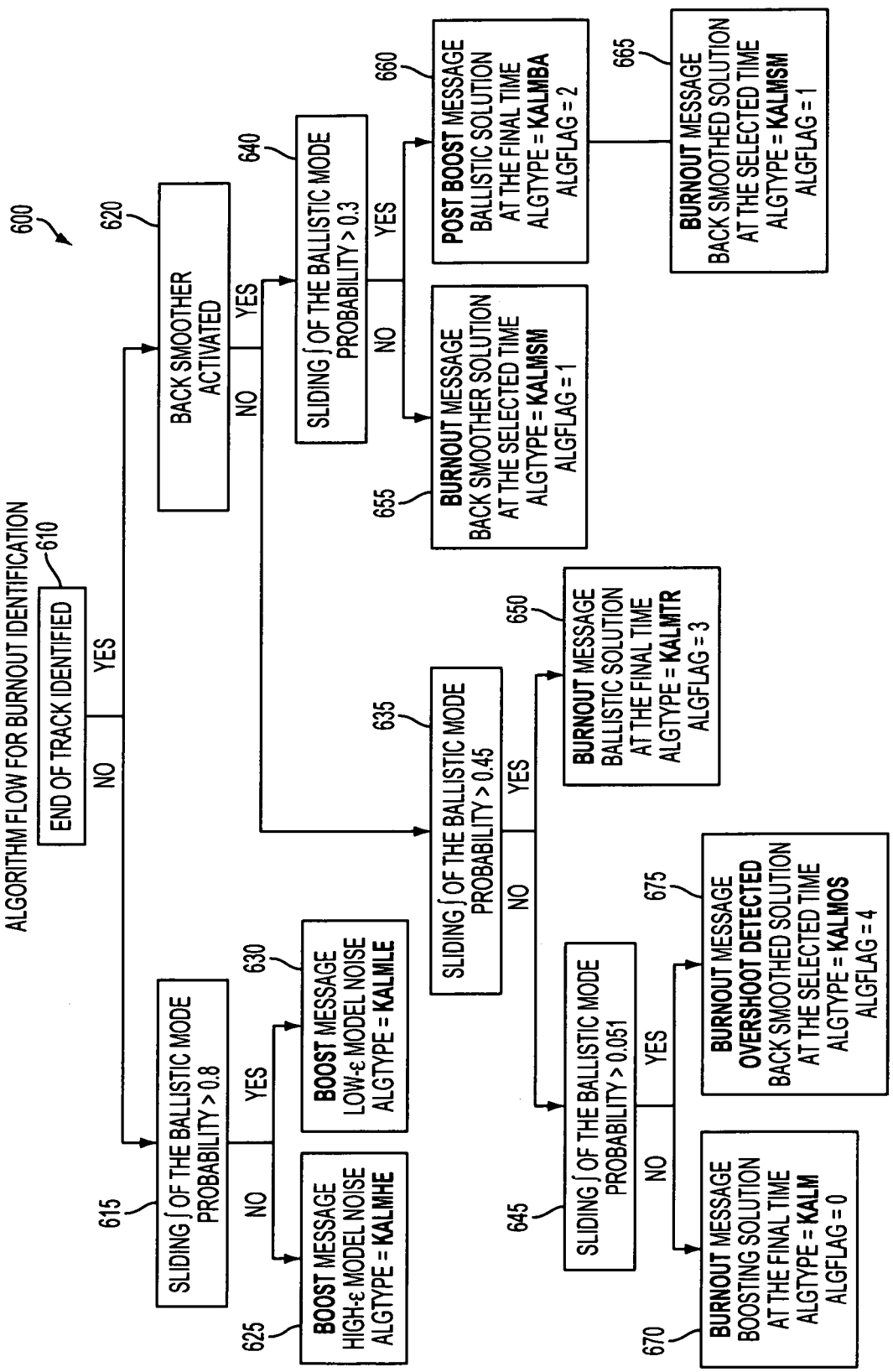
FIG. 6 is a schematic view of burnout state vector identification.

ORBSEA 410, as described herein, includes several features as described further in FIGS. 5 and 6. This first feature incorporates the ADSPAN method. Because boosting ballistic missiles have acceleration vectors that pitch, yaw, and grow in magnitude in an unknown manner (for any given, real-time event), the "constant" acceleration dynamics model in the filter must model these maneuvers through the phrase "process noise" in filtering parlance.

For low error level estimations, this process noise must be small when the first derivative of acceleration is small, and large when the first derivative of acceleration is large. The NIS statistic within the filter adjusts the process noise and is defined by the relation:

$$\text{NIS} = v^T S^{-1} v, \tag{19}$$

where v is the innovation (also referred to as the residual) of the current measurement (the difference between the actual measurement vector and the expected measurement vector based on the previous state estimate), and $$S = H \cdot P_{k+1,k} \cdot H^T + R, \tag{20}$$

represents the innovation covariance, defined in eqn. (16). Thus, the NIS is essentially the innovation squared divided by its variance. Under the assumption that the state errors and measurement errors are Gaussian, the NIS has a $\chi^2$ (chi-squared) distribution.

In order to account for various levels of maneuvers (not just high and low, but various levels in between), and in order for the filter to not over-react to short-term anomalous measurements, the process noise level increases and decreases in a stair-step fashion up and down to an upper limit and a lower limit, respectively. When the average value of the NIS, averaged over the last eight measurements, rises above the specified threshold, the process noise increases one step-up. If the averaged NIS continues above the threshold, then the process noise increases another step. This evaluation is performed at each time step throughout the duration of provided measurements.

Similarly, when the averaged NIS descends below the lower threshold, the process noise decreases by one step. In this manner, the process noise level can slide up and down as needed, up to but not exceeding a specified maximum, and down to but not below a specified minimum value. This overall process enables estimation over a wide variety of maneuver levels, even within one boosting event, while maintaining small estimation errors.

In the second feature for ORBSEA, the PNS method handles the covariance directional shape, whereas ADSPAN determines the process noise magnitude. Specifically, the PNS deals with the directional shape (specifically, the relative eigenvalue magnitudes with corresponding eigenvector directions of the process noise matrix) of the process noise. A local coordinate system is formed about the current estimate of the state, and shape the process noise determined within that frame.

This local frame represents an orthogonal Cartesian frame, with the x-direction along the current estimate velocity vector $\vec{v}$ (called the "along track" direction), the y-direction along the angular momentum direction (that is the cross product of the position vector with the velocity vector—called the "cross track" direction), and the z-direction defined by the cross product of x-direction with the y-direction (which is in the plane of the position and velocity vectors, perpendicular to the velocity vector, and generally "up"—called the "loft" direction). Mathematically, unit vectors in these three directions are:

$$\hat{e}_x = \vec{v}/|\vec{v}|, \tag{21}$$

$$\hat{e}_y = \vec{r} \times \vec{v}/|\vec{r} \times \vec{v}|, \tag{22}$$

and $$\hat{e}_z = \hat{e}_x \times \hat{e}_y, \tag{23}$$

where $\vec{r}$ and $\vec{v}$ are the estimated position and velocity vectors of the missile in ECEF Cartesian coordinates.

The transformation from the ECEF frame to this local frame is accomplished with the transformation matrix T:

$$T = \begin{bmatrix} \hat{e}_x^T \\ \hat{e}_y^T \\ \hat{e}_z^T \end{bmatrix}, \tag{24}$$

for the transformed unit vectors.

The process noise can then be incorporated into this local coordinate frame for each of the three directions described above. The parameters included in the local frame state include the position, velocity, and acceleration values in each direction. The local state $X_l$ is defined to be:

$$X_l = \begin{bmatrix} x \\ y \\ z \\ \dot{x} \\ \dot{y} \\ \dot{z} \\ \ddot{x} \\ \ddot{y} \\ \ddot{z} \\ b_1 \\ \vdots \\ b_q \end{bmatrix}, \tag{25}$$

where acceleration is expressed in local coordinates as double-time-differentials for the along-track $\ddot{x}$, cross-track $\ddot{y}$ and loft $\ddot{z}$ directions.

The initial form of the local process noise matrix $Q_l$ is:

$$Q_l = \varepsilon^2 \cdot \begin{bmatrix} \frac{\Delta t^5}{20} & - & - & - & - & - & - & - & - & - & - & - \\ - & \frac{\Delta t^5}{20} & - & - & - & - & - & - & - & - & - & - \\ - & - & \frac{\Delta t^5}{20} & - & - & - & - & - & - & - & - & - \\ - & - & - & \frac{\Delta t^3}{3} & - & - & - & - & - & - & - & - \\ - & - & - & - & \frac{\Delta t^3}{3} & - & - & - & - & - & - & - \\ - & - & - & - & - & \frac{\Delta t^3}{3} & - & - & - & - & - & - \\ - & - & - & - & - & - & \Delta t & - & - & - & - & - \\ - & - & - & - & - & - & - & \Delta t & - & - & - & - \\ - & - & - & - & - & - & - & - & \Delta t & - & - & - \\ - & - & - & - & - & - & - & - & - & \frac{\varepsilon_b^2}{\varepsilon^2} & - & - \\ - & - & - & - & - & - & - & - & - & - & \ddots & - \\ - & - & - & - & - & - & - & - & - & - & - & \frac{\varepsilon_b^2}{\varepsilon^2} \end{bmatrix} \tag{26}$$

where noise error $\varepsilon$ represents a scaling parameter, $\varepsilon_b$ is a bias tuning parameter, and $\Delta t$ is the time step that the state vector and covariance matrix are to be propagated forward. The coefficient $\epsilon^2$ represents, in its theoretical form, the power spectral density of the continuous-time acceleration white noise. In practice, $\epsilon^2$ functions as a tuning parameter for the filter. The scaling parameter $\epsilon$ can be scaled up and down in the ADSPAN method. The bias process noise level $\epsilon_b$ constitutes another tuning parameter.

Next, the off-diagonal elements are built from these diagonal elements via correlation coefficients and scaling parameters which are provided as single instance input values initialized for each execution of ORBSEA 410. Similarly, the diagonal elements are also scaled with the provided input scaling parameters. By objective, these scaling parameters provide a shape for the process noise that remains statistically consistent with the manner that boosting ballistic missiles maneuver over a large set of data.

For example, the largest component of acceleration noise occurs along the along-track or x-direction, because typically the largest change in acceleration originates from the increasing acceleration vector. This develops from the increasing-acceleration nature of rocket motor thrust that generally points near the velocity vector direction. The next largest noise component occurs in the loft or z-direction, because the missile maneuvers primarily in-plane. Finally, for the same reason, the cross-track or y-direction has the smallest size. Selection for the value of the input scaling parameters is dependent upon experience utilizing the real time sensors. The collective choice of values for the scaling parameters in both the diagonal element relationships and the off-diagonal elements is the uniqueness of the referred to process noise shaping, PNS.

After establishing the local noise matrix $Q_l$ for this local frame, its elements are transformed to the standard ECEF frame as noise matrix Q from eqn. (4) using the following standard transformation method:

$$Q = \begin{bmatrix} T^T & 0 & 0 & 0 & \ldots & 0 \\ 0 & T^T & 0 & 0 & \ldots & 0 \\ 0 & 0 & T^T & 0 & \ldots & 0 \\ 0 & 0 & 0 & I & \ldots & 0 \\ \vdots & \vdots & \vdots & \vdots & \ddots & 0 \\ 0 & 0 & 0 & 0 & 0 & I \end{bmatrix} \cdot Q_l \cdot \begin{bmatrix} T & 0 & 0 & 0 & \ldots & 0 \\ 0 & T & 0 & 0 & \ldots & 0 \\ 0 & 0 & T & 0 & \ldots & 0 \\ 0 & 0 & 0 & I & \ldots & 0 \\ \vdots & \vdots & \vdots & \vdots & \ddots & 0 \\ 0 & 0 & 0 & 0 & 0 & I \end{bmatrix}, \quad (27)$$

where T is the 3×3 transformation matrix described above in eqn. (27), and 0 is the 3×3, the 3×2, the 2×3, or else the 2×2 matrix of zeros (the size being according to each of the respective locations).

Burnout-time estimation through the back smoother represents another component to the ORBSEA process. After determination that the missile 320 has, to a high probably, stopped thrusting (i.e., the rocket motor has burned out), then the filtered data are processed through back smoothing equations. Smoothing denotes the process of re-estimation of the state and covariance at times earlier than the latest measurements. For $t_k$ as the latest measurement time, then for any previous measurement time $t_j < t_k$, the measurements after $t_j$ can be used to provide a better estimate of the state back at $t_j$. The process of re-estimating previous steps is known as smoothing.

Smoothing represents a well known and well established technique. The novelty in the ORBSEA process constitutes estimating the burnout-time of the missile 320 by smoothing. The basis for estimating the burnout-time is that typically the velocity magnitude increases during boost phase, subsequently decreasing after burnout. The time of the peak velocity magnitude found by the smoother, therefore, is the estimated burnout time. This estimation has been found to be in excellent accord with the true burnout-time—generally within three seconds.

ORBSEA 410 also includes launch point, time, and bearing estimation. The back smoother can also be used to compute an estimation of the observed ballistic missile's launch time, latitude, longitude, and initial bearing. ORBSEA 410 employs smoothed estimates of the state rather than the filtering method of that reference. The launch bearing of the missile 320 can be computed with standard spherical trigonometry using two positions on the Earth 210, namely the estimated launch latitude and longitude, and the latitude and longitude corresponding to a smoothed estimate down-range.

All incorporated improvements to the basic Kalman filter, process noise shaping (PNS), Ascending and Descending Stair-step Process-noise Adjustment via NIS (ADSPAN), and the Floating RUV measurement frame contribute in entirety to produce high quality (low error and consistent covariance size and shape) smoothed states which are use in the calculation of the observed ballistic missile's launch time, latitude, longitude, and initial bearing.

The launch time estimate of the missile 320 is based on the simplifying assumption that the time from launch to the current smoothed estimate approximately equals a purely vertical launch, with constant gravity and no drag, to the same altitude as the current smoothed estimate. In order to maintain only small errors in this approximation, these computations use only smoothed data points proximate to launch (i.e., early in the boost phase).

The estimation of the time-of-flight from launch to the smoothed point can be found by iterating on eqn. (28):

$$t_{j+1} = \frac{u_e}{a_0} - \frac{h - (v_0 + u_e)t_j + \frac{1}{2}g_e t_j^2}{u_e \cdot \ln\left(1 - \frac{a_0 t_j}{u_e}\right)}, \quad (28)$$

where $u_e$ is the equivalent exhaust velocity of the rocket motor, $a_0$ is the initial acceleration of the missile, h is the smoothed estimate-point altitude, $v_0$ is the initial velocity of the missile 320, and $g_e$ is the gravitational acceleration on the Earth 210. The parameters $u_e$, $a_0$, and $v_0$ are estimated. Among various rocket motors, the value of exhaust velocity $u_e$ exhibits little variation; so that a nominal value can be chosen. Similarly, the results are not very sensitive to realistic variations in initial velocity $v_0$ so that a small value near zero can be fixed within the algorithm. The missile's initial acceleration $a_0$, however, is of sufficient variation as to be calculated relative to the current smoothed filter estimates.

The missile's initial acceleration $a_0$ can be chosen to fit the following form:

$$a_0 = g_e(1 + e^{\alpha}), \quad (29)$$

such that initial acceleration $a_o$ must be greater than $g_e$ for the missile to lift off the ground. Thus $e^{\alpha} > 0$ for all exponents $\alpha$. Next, $v_c$, the "current" speed (from the smoothed estimate, at the same time as h), is assumed to be related to this same $\alpha$ by the following chosen form:

$$v_c = A \cdot e^{-\lambda \cdot a}, \quad (30)$$

where A and $\lambda$ are parameters chosen to yield a good relationship between $v_c$ and $a_0$ for various known missile data. A least-squares fit of A and $\lambda$ to known data for $v_c$ and $a_0$, computed offline, are used in ORBSEA 410. These processes provide very good estimates with real-time measurement data—generally accurate to within a few seconds.

FIGS. 5 and 6 represent flowcharts to aid in describing the ORBSEA process. FIG. 5 illustrates a schematic view 500 of a fusion algorithm process flow. An input step 505 receives data for a line-of-sight playback packet. The received data are evaluated for latency at testing operation 510, which proceeds to either an output setup operation 515 or a determination state operation 520. The output setup operation 515 establishes parameters for recording the results leading to an initializing operation 525. The determination state operation 520, related to the latency of available data, outputs the final burnout state and covariance estimate to an NSAT (number of satellites), Event Report (NER). The initializing operation 525 initializes the state and covariance estimate and proceeds to a propagation operation 530 for the state X and covariance P in ECEF coordinates.

The prediction operation 530 proceeds either to a transform operation 535 or to an operation to retain the predicted state and covariance 540. The transform state 535 converts the state and covariance from ECEF to RUV coordinates and proceeds to a reset operation 545 that performs the ADSPAN process noise adjustment and a possible ballistic reset of PNS. This proceeds to an update step 550 that updates state and covariance in RUV using Kalman filter equations, which proceeds to a retransform operation 555 that transforms state and covariance from RUV to ECEF coordinates, and then proceeds to an estimation operation 560 to retain the state and covariance.

The propagation and estimation retention steps 540 and 560 proceed to a smoothing operation 565 to calculate smoothed state estimates upon completion of the time loop. This proceeds to a calculation operation 570 to determine launch point, time and bearing. This proceeds to a final message operation 575 involving end-of-track logic. Either the retransform or the message operations 555 or 575 can proceed to an output operation 580. The message operation 575 also engages a burnout operation 585 that updates the burnout estimate. The return feedback from retransform operation 555 to the propagation state operation 530 constitutes a time loop 590. The return feedback from the output step 580 to the testing operation 515 constitutes a packet loop 595.

FIG. 6 illustrates a schematic view 600 of an identification algorithm process flow. From the message operation 575, an identification operation 610 indicates an end-of-track condition query. In response to a negative determination, the process proceeds to an operation 615 that evaluates the sliding window integral of the ballistic mode probability to greater than 0.8 in value. In response to a positive determination, the process proceeds to a back-smoother evaluation test 620. The sliding operation 615 includes a query, negative leading to a high-noise message operation 625, positive leading to a low-noise message operation 630.

The back-smoother evaluation operation 620 includes a query, negative leading to step 635 that evaluates the sliding window integral of the ballistic mode probability to greater than 0.45 in value, positive leading to an integral sliding operation 640 that evaluates the sliding window integral of the ballistic mode probability to greater than 0.3 in value. The integral sliding operation 635 involves a query, negative result leading to an integral sliding step 645, positive result leading to a final-time message 650 of a burnout solution. The back-smoother operation 640 evaluates the sliding window integral of the ballistic mode probability to greater than 0.3 in value. The back-smoother operation 640 includes a query, negative result leading to a smoothed burnout message operation 655, positive result leading to a post-boost message operation 660 that proceeds to a burnout message 665, analogous to the message operation 655. The integral sliding step 645 includes a query, negative result leading to a boosting solution operation 670, positive result leading to an overshoot detection solution operation 675.

For each measurement time associated within FIG. 5 operation 590, data from operations 540 and 560 are retained for use in operation 565. The respective smoothed states, and in particular the smoothed position vector and by inference the smoothed estimate point altitude h is used in eqn. (28). The smoothed velocity vector and by inference the smoothed speed $v_c$ is used in eqn. (30) when solving for the exponent α needed in eqn. (29) and then extended to solve eqn. (28). That solution to eqn. (28) is retained for each of the measurement times associated with operation 590.

Figure 7:
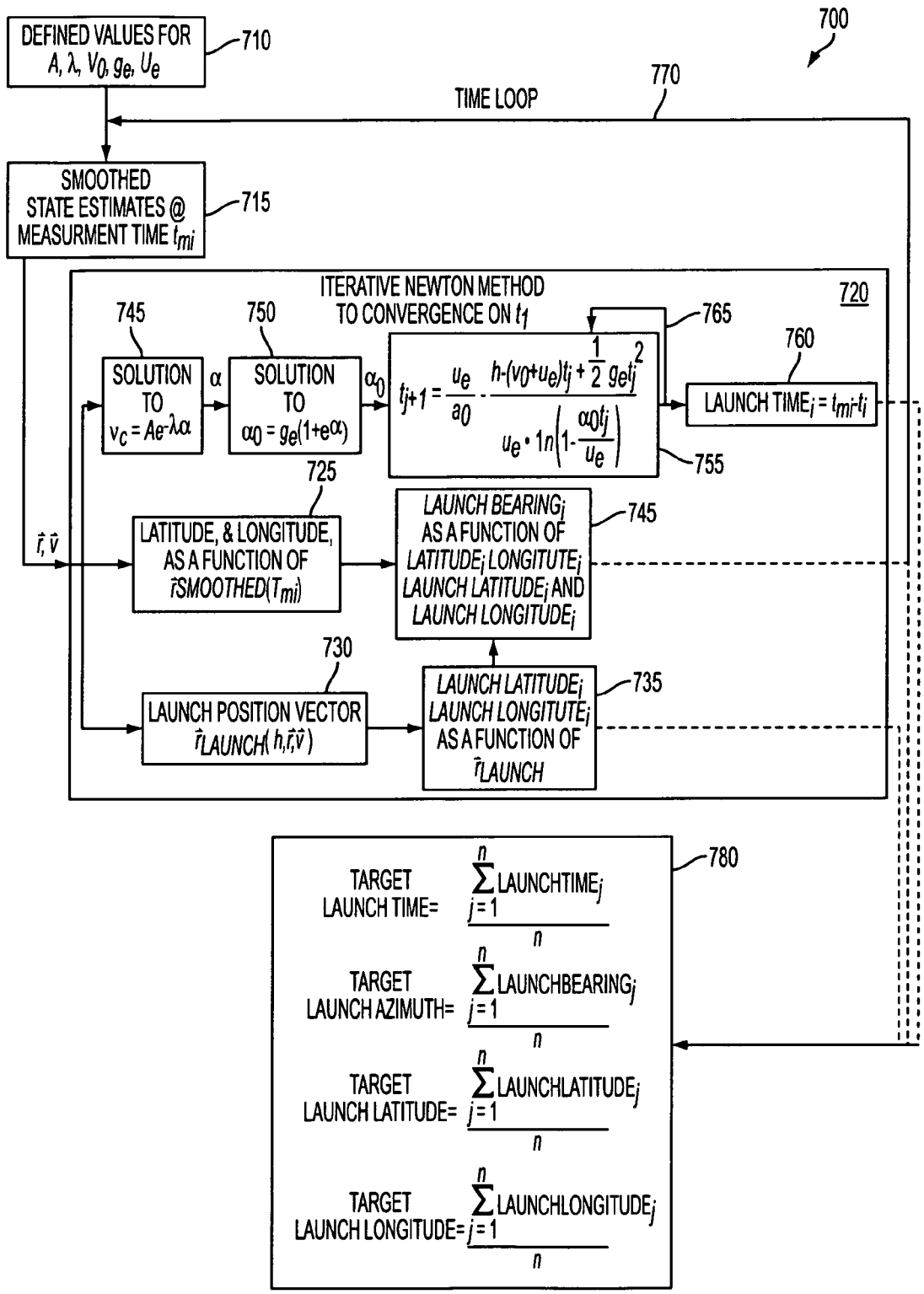
FIG. 7 is a schematic view of the target launch calculation process.

FIG. 7 illustrates a schematic view 700 of the launch time, point and bearing algorithm process flow as depicted from operation 570 (in FIG. 5). Description of the à priori chosen parameters used within definition 710 is provided with respect to eqn. (28). The back smoothed states generated in step 565 are shown in the flow of the schematic at iterative operation 715 that proceeds to a launch processor 720. For each iteration, the back-smoothed position and velocity states are transformed to Earth geodetic latitude and longitude in operation 725 and an estimate of the launch position vector in operation 730. A subsequent step using the same transformation for step 725 is then performed on the output from operation 730 within operation 735. Outputs from operations 725 and 735 are then combined using spherical trigonometry transformations to obtain the target launch bearing in operation 740.

Values as defined for eqn. (29) are processed via operation 745 as input for operation 750 for eqn. (30). Computation operation 755 receives the resulting initial acceleration $a_0$ from operation 750 and, together with pre-defined values from definition 710, computes eqn. (28). Output time $t_{j+1}$ at the next iterative step from operation 755 can be refined by the iterative substitution feedback shown in loop 765 to provide a launch time that constitutes the difference between measured time and step time of $t_{m_j} - t_j$. Operations 755, 760 and 765 are performed successively until the time-step absolute difference value between the $(j+1)^{th}$ time and the $j^{th}$ time reduces to below a convergence threshold δ, as expressed by $|t_{j+1} - t_j| < \delta$. Outputs from operations 735, 740, and 760 are retained as input to averaging operation 780 to generate the averaged results over all samples within the time loop.

The operations described in FIGS. 5 through 7 constitute process steps that can be performed by automation devices, such as computer processors. Such operations, or select portions thereof, can be performed on platforms located at the satellites 220, one or more ground stations 360, 370 and 380, and/or the fusion center 390.

ORBSEA also includes the Test-and-Exclude-Bad-Measurements (TEBM) method, such as for tracking the wrong object, or some other error. The primary tests for marking a measurement as "bad" and so as to discard the measurement include:

(i) if normalized innovation squared exceeds a threshold filter value, such as NIS>25;

(ii) if the measurement platform is of a certain type, and the last four measurements for the free-flight portion of the filter all have NIS>10; and (iii) if the main filter's NIS>11 and the Free-Flight Filter's NIS>12.5 and the scaling ratio of the ADSPAN method's ε to the nominal value ($\epsilon_0$) is not greater than three ($\epsilon/\epsilon_0 \le 3$), for a given sensor type.

These criteria have been found to be crucial for good performance of the filter. If invalid or "bad" measurements remain, the resulting estimation can be deemed badly skewed and thus discarded.

The process developed in ORBSEA, while applied to sensors onboard satellites that measure only angles (and not range), can be readily extended to a wide variety of other sensors and platforms. The process is insensitive to sensor platform, e.g., satellite 220; only a position vector of the sensor's location at the measurement time need be known about the platform itself (apart from the measurement coming therefrom). Hence, ships, ground stations, ground mobile platforms, etc., can be readily incorporated into ORBSEA as processors and/or receivers.

More importantly, other sensor measurement types can be easily folded into the process. Radars, for example, typically only add range to the u and v measurements. Because range is also linear in the RUV measurement update frame, that parameter can be readily incorporated into ORBSEA. Phased array radars, similarly, measure a linear combination of range and range-rate, which combination is also linear in the RUV space. Doppler measurements are also linear in RUV. Ladders (i.e., laser radars), optical sensors, bearings-only measurement types, and a wide variety of similar sensors can all be naturally folded into ORBSEA. In that sense this includes not only an OPIR algorithm, but a broader multiple-sensor fusion technique.

ORBSEA provides the following resulting information when processing a set of measurements from a collection of sensors:
  (i) State valid time, UTC seconds after midnight
  (ii) Earth-Centered-Earth Fixed position vector
  (iii) Earth-Centered-Earth Fixed velocity vector
  (iv) Earth-Centered-Earth Fixed acceleration vector
  (v) Earth-Centered-Earth Fixed 9×9 Covariance Matrix
  (vi) Target launch time, UTC seconds after midnight
  (vii) Target geodetic latitude
  (viii) Target geodetic longitude
  (ix) Target launch bearing ORSEA processes the given input measurements in a real-time computer environment with processing times ranging from 10's of micro-seconds for the number of measurements ~100-200 up to 1.0 second for the number of measurements ~1000. ORBSEA requires the following inputs:
  (i) Process noise shaping (PNS) baseline process noise;
  (ii) Process noise shaping (PNS) off-diagonal scaling factors (2);
  (iii) Table of possible sensor identification codes;
  (iv) Respective sensor UN measurement uncertainties.

This minimal list requires no information relative to the target under observation by the sensors.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An automated system for generating an estimation of current position, velocity and acceleration state vectors in an extended Kalman filter, and associated uncertainty covariance of a ballistic target missile, said system comprising:

a tensor processor for constructing a state tensor X of the missile from a plurality of passive angle-only infrared measurements by sensors on multiple satellite platforms in Earth-Centered, Earth-Fixed (ECEF) coordinates;

a translation processor for translating said state tensor x to coordinates as a transformed state tensor Y;

a covariance processor for propagating a covariance matrix P from an approximated state transition matrix $\Phi$ and a process noise matrix Q;

a tensor updating processor for updating said transformed state tensor Y based on a Kalman gain K and a measurement matrix H;

a covariance updating processor for updating said covariance matrix P based on said Kalman gain K and said measurement matrix H;

a flight-time estimator for iterating estimation of time-of-flight of the missile from launch based on parameters from said transformed state tensor Y and said covariance matrix P;

an analyzer for determining the state vectors of the missile from said time-of-flight; and a display for presenting the state vectors as output.

2. The system according to claim 1, wherein said noise matrix is translated from a local noise matrix based on a propagation time-step, a dynamic time dependent scaling parameter, and a bias process noise level.

3. The system according to claim 1, wherein said state tensor is updated, and updating said state tensor further includes smoothing of a time-of-flight from a launch event.

4. The system according to claim 1, wherein constructing said state tensor incorporates initial position and direction of the missile.

5. An automated system for generating an estimation of current position, velocity and acceleration state vectors and an associated uncertainty (covariance) of a boosting ballistic missile, said system comprising:

a tensor determiner for constructing a state tensor X of the missile from a plurality of sensor measurements in Earth-Centered, Earth-Fixed (ECEF) coordinates using passive angle-only measurements from a sensors, said state tensor X expressed as:

$$X = \begin{bmatrix} \vec{r} \\ \vec{v} \\ \vec{a} \\ b_1 \\ \vdots \\ b_q \end{bmatrix},$$

where terms for the missile include $\vec{r}$ as position vector, $\vec{v}$ as velocity vector, $\vec{a}$ as acceleration vector, and $b_1$ terms from 1 to q as bias estimation vectors;

a tensor translator for translating said state tensor X to coordinates as a transformed state tensor Y expressed as:

$$Y = \begin{bmatrix} r \\ u \\ v \\ \dot{r} \\ \dot{u} \\ \dot{v} \\ \overline{a} \\ b_1 \\ \vdots \\ b_q \end{bmatrix},$$

where terms include $r=\sqrt{x^2+y^2+z^2}$ as the radius, $u=x/r$ as loft state coordinate, $v=y/r$ as cross-track state coordinate, $\dot{r}=(x\dot{x}+y\dot{y}+z\dot{z})/r$ as temporal range change, $\dot{u}=(\dot{x}x-x\dot{r})/r^2$ as temporal loft change and $\dot{v}=(\dot{y}r-y\dot{r})/r^2$ as temporal cross-track change;

a matrix determiner for determining a covariance matrix p from said transformed state protecting chronologically forward incrementally from time $t_k$ of measurement number k to the time $t_{k+1}$ of measurement number k+1 as:

$$P_{k+1,k}=\Phi(t_{k+1},t_k) \cdot P_{k,k} \Phi(t_{k+1},t_k)^T + Q(t_{k+1}-t_k)$$

where terms include Q(t) as process noise matrix, and $\Phi$ as state transition matrix;

$$\Phi(t,t_0) = \begin{bmatrix} I & (t-t_0)\cdot I & \frac{1}{2}(t-t_0)^2 \cdot I & 0 & \cdots & 0 \\ 0 & I & (t-t_0)\cdot I & 0 & \cdots & 0 \\ 0 & 0 & I & 0 & \cdots & 0 \\ 0 & 0 & 0 & I & \cdots & 0 \\ \vdots & \vdots & \vdots & \vdots & \ddots & \vdots \\ 0 & 0 & 0 & 0 & \cdots & I \end{bmatrix},$$

where t is time, $t_0$ is initial time and I represents an identity matrix;

a state processor for updating said transformed state; and
a matrix processor for updating said covariance matrix.

6. The system according to claim 5, wherein said determiners for said state vector and covariance matrix incorporate a time-dependent ECEF/floating radius/u-normalized direction cosine/v-normalized direction cosine (FRUV) dual reference frame to retain an assumed Gaussian-shape of errors of said angle-only measurements.

7. The system according to claim 5, wherein said determiners for said state vector and said covariance matrix incorporate process noise shaping (PNS) for said process noise matrix Q expressed as:

$$Q = \begin{bmatrix} T^T & 0 & 0 & 0 & \cdots & 0 \\ 0 & T^T & 0 & 0 & \cdots & 0 \\ 0 & 0 & T^T & 0 & \cdots & 0 \\ 0 & 0 & 0 & I & \cdots & 0 \\ \vdots & \vdots & \vdots & \vdots & \ddots & \vdots \\ 0 & 0 & 0 & 0 & \cdots & I \end{bmatrix} \cdot Q_l \cdot \begin{bmatrix} T & 0 & 0 & 0 & \cdots & 0 \\ 0 & T & 0 & 0 & \cdots & 0 \\ 0 & 0 & T & 0 & \cdots & 0 \\ 0 & 0 & 0 & I & \cdots & 0 \\ \vdots & \vdots & \vdots & \vdots & \ddots & \vdots \\ 0 & 0 & 0 & 0 & \cdots & J \end{bmatrix},$$

where terms include T as a 3×3 transformation matrix, 0 is a matrix of zeros and $Q_l$ as a local process noise matrix expressed as:

$$Q_l = \varepsilon^2 \cdot \begin{bmatrix} \frac{\Delta t^5}{20} & - & - & - & - & - & - & - & - & - \\ - & \frac{\Delta t^5}{20} & - & - & - & - & - & - & - & - \\ - & - & \frac{\Delta t^5}{20} & - & - & - & - & - & - & - \\ - & - & - & \frac{\Delta t^3}{3} & - & - & - & - & - & - \\ - & - & - & - & \frac{\Delta t^3}{3} & - & - & - & - & - \\ - & - & - & - & - & \frac{\Delta t^3}{3} & - & - & - & - \\ - & - & - & - & - & - & \Delta t & - & - & - \\ - & - & - & - & - & - & - & \Delta t & - & - \\ - & - & - & - & - & - & - & - & \Delta t & - \\ - & - & - & - & - & - & - & - & - & \frac{\varepsilon_b^2}{\varepsilon^2} & - & - \\ - & - & - & - & - & - & - & - & - & - & \ddots & - \\ - & - & - & - & - & - & - & - & - & - & - & \frac{\varepsilon_b^2}{\varepsilon^2} \end{bmatrix}$$

where terms include $\varepsilon$ as noise error scaling parameter, $\varepsilon_b$ as a bias tuning parameter, and $\Delta t$ as a time step for propagating said state vector and said covariance matrix.

8. The system according to claim 7, wherein said determiners for said state vector and covariance matrix incorporates an Ascending and Descending Stair-step Process-noise Adjustment via normal innovation squared (NIS) (ADSPAN) method to define said noise error scaling parameter for the said process noise matrix.

9. The system according to claim 5, further including a smoothing processor for time-averaging said state tensor to calculate time-of-flight from a launch event.

10. The system according to claim 5, further including a smoothing processor for time-averaging said state tensor to calculate initial position and direction of the missile.

11. The system according to claim 5, wherein said state processor for updating said transformed state is expressed as $Y_{k+1,k+1}=Y_{k+1,k}-K \cdot H \cdot Y_{k+1,k}$, where terms include K as Kalman gain and H as measurement matrix.

12. The system according to claim 11, wherein said Kalman gain K is expressed as:

$$K=P_{k+1,k} \cdot H^T \cdot S^{-1}, \text{ and}$$

said measurement matrix H is expressed as:

$$H = \begin{bmatrix} 0 & 1 & 0 & 0 & 0 & 0 & \cdots & 1 & 0 & \cdots & 0 \\ 0 & 0 & 1 & 0 & 0 & 0 & \cdots & 0 & 1 & \cdots & 0 \end{bmatrix},$$

where terms include $H^T$ as transpose of said measurement matrix, and S as innovation covariance expressed as:

$$S=H \cdot P_{k+1,k} \cdot H^T + R,$$

where terms include R as 2×2 measurement covariance matrix.

* * * * *